(12) United States Patent
Uslubas et al.

(10) Patent No.: US 8,861,850 B2
(45) Date of Patent: Oct. 14, 2014

(54) DIGITAL IMAGE COLOR CORRECTION

(75) Inventors: Serhan Uslubas, San Francisco, CA (US); David Hayward, Los Altos, CA (US)

(73) Assignee: Apple Inc., Cupertino, CA (US)

(*) Notice: Subject to any disclaimer, the term of this patent is extended or adjusted under 35 U.S.C. 154(b) by 51 days.

(21) Appl. No.: 13/363,107

(22) Filed: Jan. 31, 2012

(65) Prior Publication Data

US 2013/0195353 A1 Aug. 1, 2013

(51) Int. Cl.
*G06K 9/00* (2006.01)

(52) U.S. Cl.
USPC ........ 382/167; 345/600; 345/601; 348/223.1; 348/650; 358/1.9; 358/518; 358/523; 382/260

(58) Field of Classification Search
None
See application file for complete search history.

(56) References Cited

U.S. PATENT DOCUMENTS

| | | | | |
|---|---|---|---|---|
| 5,509,111 A * | 4/1996 | Hong et al. | ................... | 345/591 |
| 5,552,904 A * | 9/1996 | Ryoo et al. | ................... | 358/518 |
| 5,731,988 A * | 3/1998 | Zandi et al. | ................... | 382/167 |
| 5,982,941 A * | 11/1999 | Loveridge et al. | ............ | 382/260 |
| 6,476,877 B2 * | 11/2002 | Kihara et al. | ................ | 348/650 |
| 6,639,628 B1 * | 10/2003 | Lee et al. | ................... | 348/223.1 |
| 6,839,064 B2 * | 1/2005 | Nakami | ........................ | 345/556 |
| 7,176,935 B2 * | 2/2007 | Higgins | ........................ | 345/589 |
| 7,545,533 B2 * | 6/2009 | Ok et al. | ......................... | 358/1.9 |
| 7,667,869 B2 * | 2/2010 | Nagao et al. | ................... | 358/1.9 |
| 2003/0184559 A1 * | 10/2003 | Jiang et al. | .................... | 345/600 |
| 2005/0099431 A1 * | 5/2005 | Herbert et al. | ................ | 345/601 |
| 2005/0219574 A1 * | 10/2005 | Ok et al. | ......................... | 358/1.9 |
| 2005/0254075 A1 * | 11/2005 | Nagao | ............................ | 358/1.9 |
| 2005/0275912 A1 * | 12/2005 | Chen et al. | .................... | 358/523 |
| 2006/0284872 A1 * | 12/2006 | Brown Elliott | ............... | 345/426 |
| 2007/0052987 A1 * | 3/2007 | Jung | .............................. | 358/1.9 |
| 2007/0139739 A1 * | 6/2007 | Kim et al. | ..................... | 358/518 |
| 2007/0188779 A1 * | 8/2007 | Nagao et al. | ................... | 358/1.9 |
| 2008/0193012 A1 * | 8/2008 | Suzuki | ........................... | 382/167 |
| 2009/0002390 A1 * | 1/2009 | Kuno | ............................. | 345/593 |
| 2009/0184974 A1 * | 7/2009 | Kuno | ............................. | 345/589 |

* cited by examiner

*Primary Examiner* — Tsung-Yin Tsai
(74) *Attorney, Agent, or Firm* — Wong, Cabello, Lutsch, Rutherford & Brucculeri, LLP (57) ABSTRACT

Systems, methods, and computer readable media for performing color correction operations to address memory color artifacts in a manner suited for real-time operations. In general, techniques are disclosed for correcting memory color rendering artifacts in an image without performing color space conversions. In one implementations, hue-saturation-value (HSV) image correction values may be expressed solely in terms of an image's base red-green-blue (RGB) color space values. Once expressed in this manner, color correction may be applied to the image directly—without the need to convert the image's color space into and out of a working color space (e.g., an HSV color space). As no color space conversions are necessary, the disclosed techniques are well-suited to real-time operations.

33 Claims, 7 Drawing Sheets

DIGITAL IMAGE COLOR CORRECTION

BACKGROUND

This disclosure relates generally to the field of digital image processing. More particularly, but not by way of limitation, this disclosure relates to color correction techniques to repair memory color rendering artifacts without the need to perform color space conversions.

Transforming image sensor color information to perceptual color information is an essential operation in all digital imaging systems. Further, this transformation must be performed in a manner that yields pleasing results to human viewers. Producing pleasing colors is especially important for memory colors where there is a strong preference favoring primary (red, green, and blue) and secondary (yellow, cyan, and magenta) hues. As used herein, the phrase "memory colors" refers to those colors for which humans express a strong correlation. For example, people expect the sky to be blue, the grass to be green and a stop sign to be red. (Accordingly, as to the sky, grass and stop signs the colors blue, green and red are memory colors.)

Figure 1:
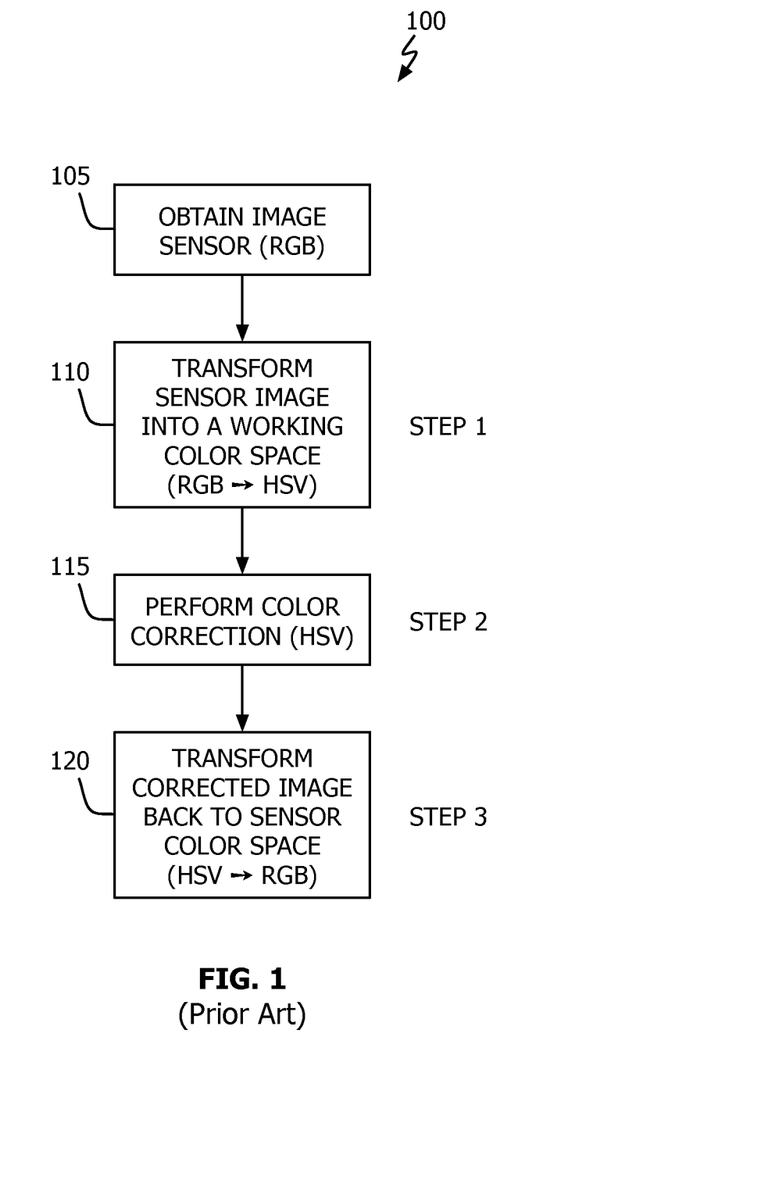
FIG. 1 shows, in flowchart form, a prior art approach for correcting memory color rendering artifacts.

Due to the mixed lighting conditions under which many imaging systems operate, memory colors can be rendered as tertiary colors (orange, lime, aqua, denim, violet, and scarlet). When this happens, the resulting image is unpleasing. Prior art approaches to correcting memory color rendering problems (i.e., the tendency of memory colors to render as tertiary colors) use a three-step operation as illustrated in FIG. 1. As shown there, prior art memory color correction operation 100 begins by obtaining an image from an image sensor (block 105). Images so obtained are in the sensor's color space, for example, a red-green-blue (RGB) color space. In a first step, the image is transformed into a second, or working color space such as a hue-saturation-value (HSV) color space (block 110). In a second step, memory color rendering artifacts are detected and corrected (block 115). In a third step, the image is transformed back into the sensor's color space (block 120). While this approach can effectively address memory color rendering problems, color space conversion operations (blocks 110 and 120) are computationally expensive (time consuming). As a result, operations in accordance with FIG. 1 may lead to performance bottlenecks for a hosting application (i.e., an application executing on a platform that performs image processing tasks) or the inability of an imaging system to operate in real-time.

In another prior art approach, three dimensional lookup tables (3D LUTs) are used to correct memory color rendering artifacts. High precision 3D LUTs require large amounts of memory and, may still lead to color contouring in the resulting image. As such, 3D LUTs are an unacceptable solution in many cases. It would be beneficial, therefore, to provide a means to correct memory color rendering artifacts in a timely fashion without the memory requirement of 3D LUT implementations.

SUMMARY

In one embodiment a method to color correct a digital image includes selecting a pixel from the digital image having component values in a first color space (e.g., a red-green-blue color space), determining which of multiple disjoint regions in a specified color gamut the pixel belongs based on its component values, determining a color correction value for each of the pixel's component values based, at least in part, on the pixel's region and its color component values, and applying each color correction value to the pixel's corresponding component value to produce a color corrected pixel (also in the first color space). The acts of selecting, determining and applying may be repeated for each of a number of pixels from the digital image to produce a color corrected image in the first color space. In one embodiment, all pixels within the digital image may be processed as described. In another embodiment, fewer than all of an image's pixels may be processed. Methods in accordance with these embodiments may be embodied in computer executable instructions and/or incorporated in a computer system.

In another embodiment, color correction may be provided by obtaining a color digital image having pixels, each of which has multiple component values from a color space, identifying a first subset of pixels from the pixels, determining a first plurality of color correction values, each of the first plurality of color correction values corresponding to a pixel in the first subset of pixels and, further, having multiple component values from the color space. Once determined, each color correction value may be applied to its corresponding pixel to produce color corrected pixels (also in the color space). By repeating the acts of identifying, determining and applying a number of times (each time identifying a unique subset of pixels from the digital image), a color corrected image in the color space may be produced. This method too may be embodied in computer executable instructions and/or incorporated in a computer system.

DETAILED DESCRIPTION

This disclosure pertains to systems, methods, and computer readable media for performing color correction operations to address memory color rendering artifacts. In general, techniques are disclosed for correcting memory color rendering artifacts in an image without the need to perform color space conversions or the introduction of color contouring effects. More particularly, hue-saturation-value (HSV) image correction values may be expressed solely in terms of an image's base red-green-blue (RGB) color space. Once expressed in this manner, color correction may be applied to the image directly—without the need to convert the image's color space into and out of a working color space. As no color space conversions are necessary, the disclosed techniques are well-suited to real-time operations. The disclosed methodologies may be positioned in any image signal processing pipeline, RAW image converter or image processing application.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts may be complex and time-consuming, but would nevertheless be a routine undertaking for those of ordinary skill in the design of image capture devices having the benefit of this disclosure.

Figure 2:
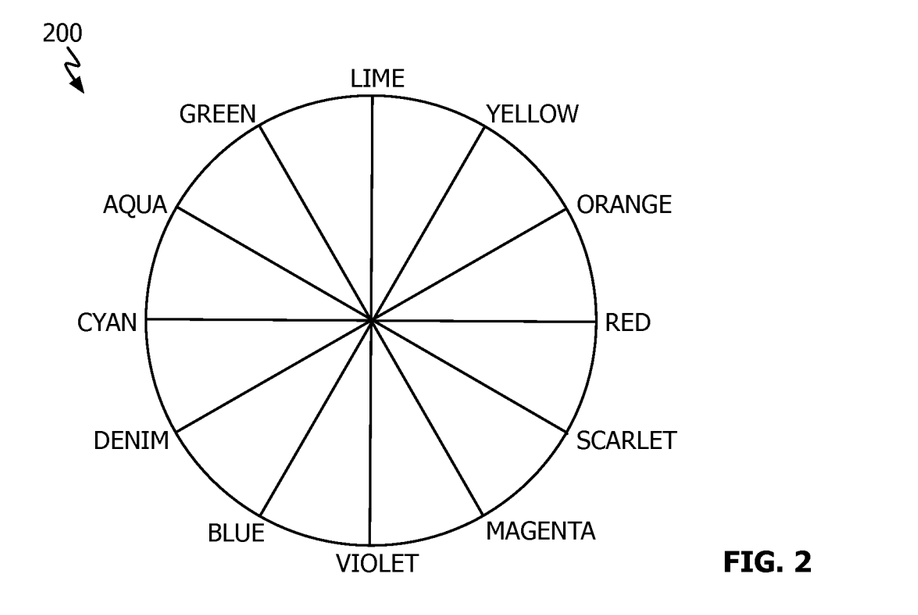
FIG. 2 shows a visual representation of a hue-saturation-value (HSV) color space.

To correct color artifacts in an image without altering its other aspects, it has been found useful to operate in the HSV color space. By making changes only through an image's H (hue) attribute, other aspects of the image such as saturation and brightness are left unchanged. It is this very reason that prior art color correction operations (see discussion above vis-à-vis FIG. 1) use the HSV color space as the working color space. The HSV color space may be visualized using a color wheel as shown in FIG. 2. As shown there, color wheel 200 organizes colors around a circle that shows relationships between primary colors, secondary colors, tertiary colors, complementary colors, etc. In general, the angle from the horizontal (Red) axis correlates to hue (H), the length of a vector from the origin to a specific pixel color (at the hue angle) correlates to saturation (S), and the value of the pixel located at the specified hue angle and saturation magnitude correlates to its value (V) or brightness.

Figure 3:
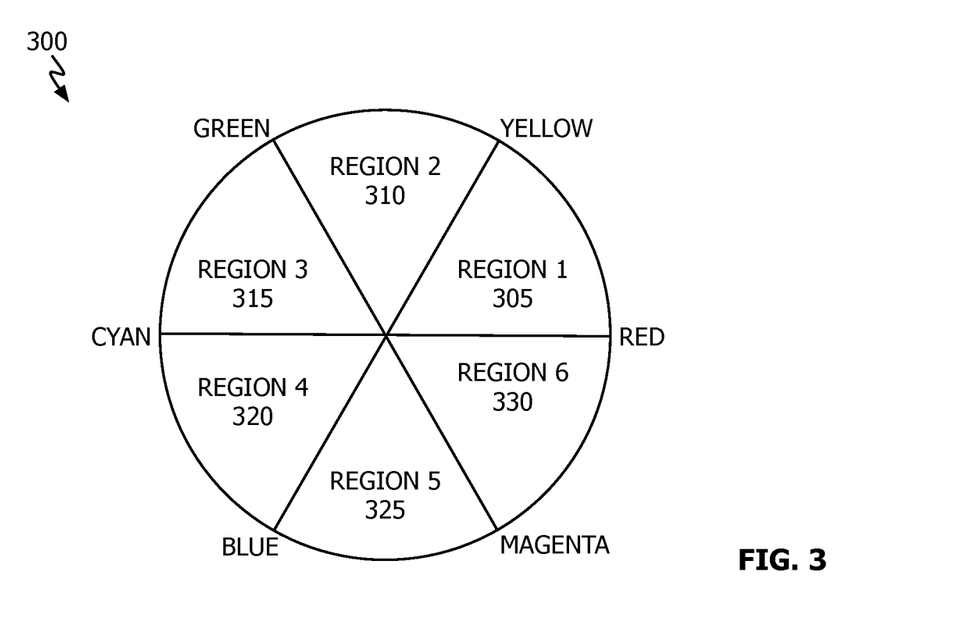
FIG. 3 shows illustrates a color wheel in which regions are described in terms of the relationship each color's red, green and blue values exhibit in accordance with one embodiment.

When certain relationships between a pixel's R, G and B values are maintained, the HSV color wheel may be divided into disjoint regions. Referring to FIG. 3, in one embodiment color wheel 300 may be divided into six (6) regions: 305 through 330. Table DD shows the relationship between a pixel's R, G and B values in each region. For example, if color wheel 300 represents an image's color gamut, each pixel whose R value is greater than its G value that is, in turn, greater than its B value is in Region 1 305. (Boundary conditions such as when R=G or G=B are addressed below. See, for example, equation 7.)

TABLE DD

| Color Wheel Value Relationships | |
| --- | --- |
| Region | R, G, B Value Relationship |
| 1 305 | R > G > B |
| 2 310 | G > R > B |

TABLE DD-continued

| Color Wheel Value Relationships | |
| --- | --- |
| Region | R, G, B Value Relationship |
| 3 315 | G > B > R |
| 4 320 | B > G > R |
| 5 325 | B > R > G |
| 6 330 | R > B > G |

Table DD and FIG. 3 illustrate how hue or color is related to groups of R, G and B values. Consider now an image sensor that generates images in an RGB color space and, more specifically, a pixel whose R, G and B values place it in Region 6 330 of FIG. 3. Such a pixel's H, S and V values may be expressed as follows:

$$H = \left(\frac{G-B}{R-G}\right)\frac{1}{6} + 1, \quad \text{EQ. 1}$$

$$S = \frac{(R-G)}{R}, \text{ and} \quad \text{EQ. 2}$$

$$V = R, \quad \text{EQ. 3}$$

where the $$\left(\frac{1}{6}\right)$$

factor is used to constrain the range of H to [0,1].

The corrected H value (H')—the value of H that corrects for memory color rendering artifacts to produce a visually pleasing result pixel—may be expressed as a function of the original R, G and B values plus, for example, a linear term. If H' is constrained to stay in the same Region as H, the following inequality holds:

$$R > (B-k) > G, \quad \text{EQ. 4}$$

where k represents the aforementioned linear bias or offset term. H' may then be expressed as a function of R, G, B and k:

$$H' = \left(\frac{G-B+k}{6(R-G)}\right) + 1. \quad \text{EQ. 5}$$

Using EQS. 1 and 5, the change in H (ΔH) to effect a desired correction may be given as:

$$\Delta H = H' - H = \left(\frac{G-B+k}{6(R-G)} + 1\right) - \left(\frac{G-B}{6(R-G)} - 1\right) = \frac{k}{6(R-G)}. \quad \text{EQ. 6}$$

The change in the value of ΔH may be expressed in any of a number of ways. In one embodiment, ΔH may be expressed as a sinusoidal function. In another embodiment, ΔH may be expressed as a polynomial function. It will be recognized that some functions are easier to compute than others. For example, the determination of sine and cosine functions are computationally expensive. Similarly, high-order polynomial functions may also be computationally expensive. In one embodiment, therefore, a quadratic function having the following properties may be used: (1) the function should only be non-zero in the Region from which the pixel currently being processed comes from; (2) the amplitude of the chosen function should be constrained such that (H+ΔH) remains in the Region from which the pixel being processed comes from; and (3) the function should monotonically decrease toward either endpoints of the Region being operated in.

The first constraint relates to the fact that the equations for H, S and V (in terms of R, G and B) are only valid within a single region as they rely on the ordering relationships identified in Table DD. The second constraint also relates to the fact that EQS. 1, 2 and 3 are only valid within a single Region. The third constraint ensures that there are no abrupt changes in the resulting correction value, which would result in visual discontinuities in the resulting image, as its color changes from Region to Region.

Again restricting the discussion to Region 6 330 the following equation is but one of a number of equations that satisfy the identified constraints:

$$\Delta H = \begin{cases} A(-144H^2 + 264H - 120) & \frac{5}{6} < H < \frac{6}{6}, \text{ where} \\ 0 & \text{otherwise} \end{cases} \quad \text{EQ. 7}$$

'A' represents a control parameter which may be varied to adjust the amount of correction. Thus, 'A' represents a parameter that a developer may vary to achieve the results needed for their particular implementation. Is should be noted that region boundary conditions (i.e., when H=5/6 or H=1), the "otherwise" aspect of EQ. 7 returns a 0. That is, no color correction is applied.

Figure 4:
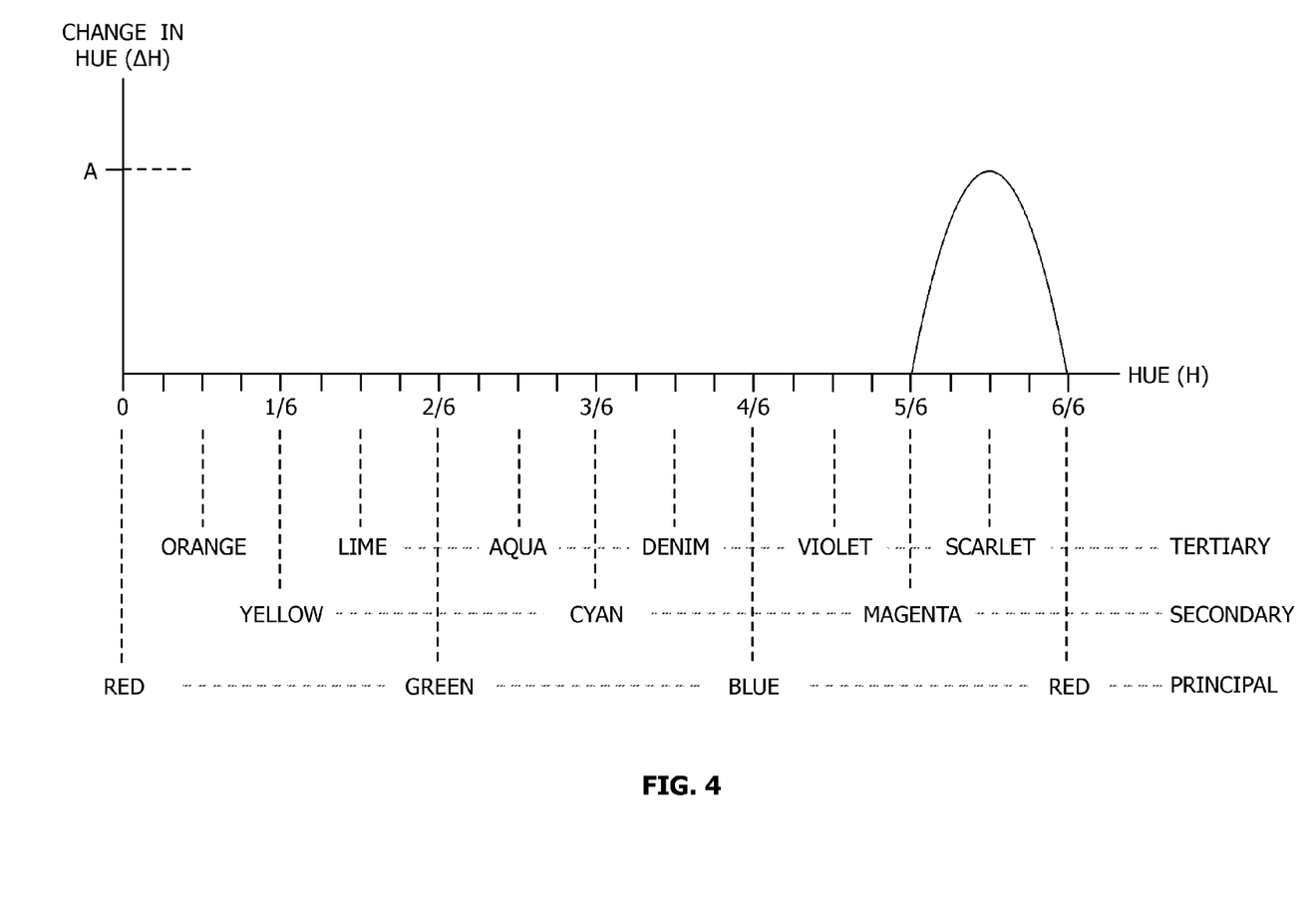
FIG. 4 shows the behavior of a color correction scheme for Region 1 of a color wheel in accordance with FIG. 3.

The behavior of ΔH in accordance with EQ. 7 is shown in FIG. 4. There, the origin of the axis is chosen to be Red and assigned a value of 0, although any color could be chosen as the origin arbitrarily. The abscissa is scaled to be between 0 and 1, where principal colors red, green and blue are positioned at H=0, 2/6 and 4/6 respectively. Secondary colors yellow, cyan and magenta are positioned at H=1/6, 3/6 and 5/6 (i.e., at an offset of 1/6 from the principal colors). Tertiary colors are defined to be positioned halfway between the principal and secondary colors: orange (1/12), lime (3/12), aqua (5/12), denim (7/12), violet (9/12), and scarlet (11/12).

Expressing bias or offset term k in terms of H may be accomplished by equating EQS. 6 and 7 (EQ. 8) and solving for k (EQ. 9):

$$\Delta H = \frac{k}{6(R-G)} = A(-144H^2 + 264H - 120), \text{ and} \quad \text{EQ. 8}$$

$$k = 6A(R-G)(-144H^2 + 264H - 120). \quad \text{EQ. 9}$$

Substituting EQ. 1 into EQ. 9 allows k to be expressed only in terms of R, G and B. Distributing similar terms yields:

$$k = \frac{24A(B-G)(R-B)}{(R-G)}. \quad \text{EQ. 10}$$

EQ. 10 shows the bias or offset term k in terms of R, G and B values explicitly without needing to convert, at any time, into the HSV color space.

Rewriting EQ. 10 and solving for final color corrected red (R'), green (G') and blue (B') values—in Region 6 330—yields:

$$R' = R, \quad \text{EQ. 11}$$

$$G' = G, \text{ and} \quad \text{EQ. 12}$$

$$B' = B - k = B - \frac{24A(B-G)(R-B)}{(R-G)}. \quad \text{EQ. 13}$$

See Appendices A through E for the derivation of similar relationships for Regions 1 through 5. As EQS. 11, 12 and 13 clearly show, the amount of color correction needed to achieve a desired effect in terms of H, S and V attributes may be determined using only a pixel's R, G and B values. Solution of EQS. 11, 12 and 13 are computationally efficient and are, therefore, amenable to real-time implementation.

Figure 5:
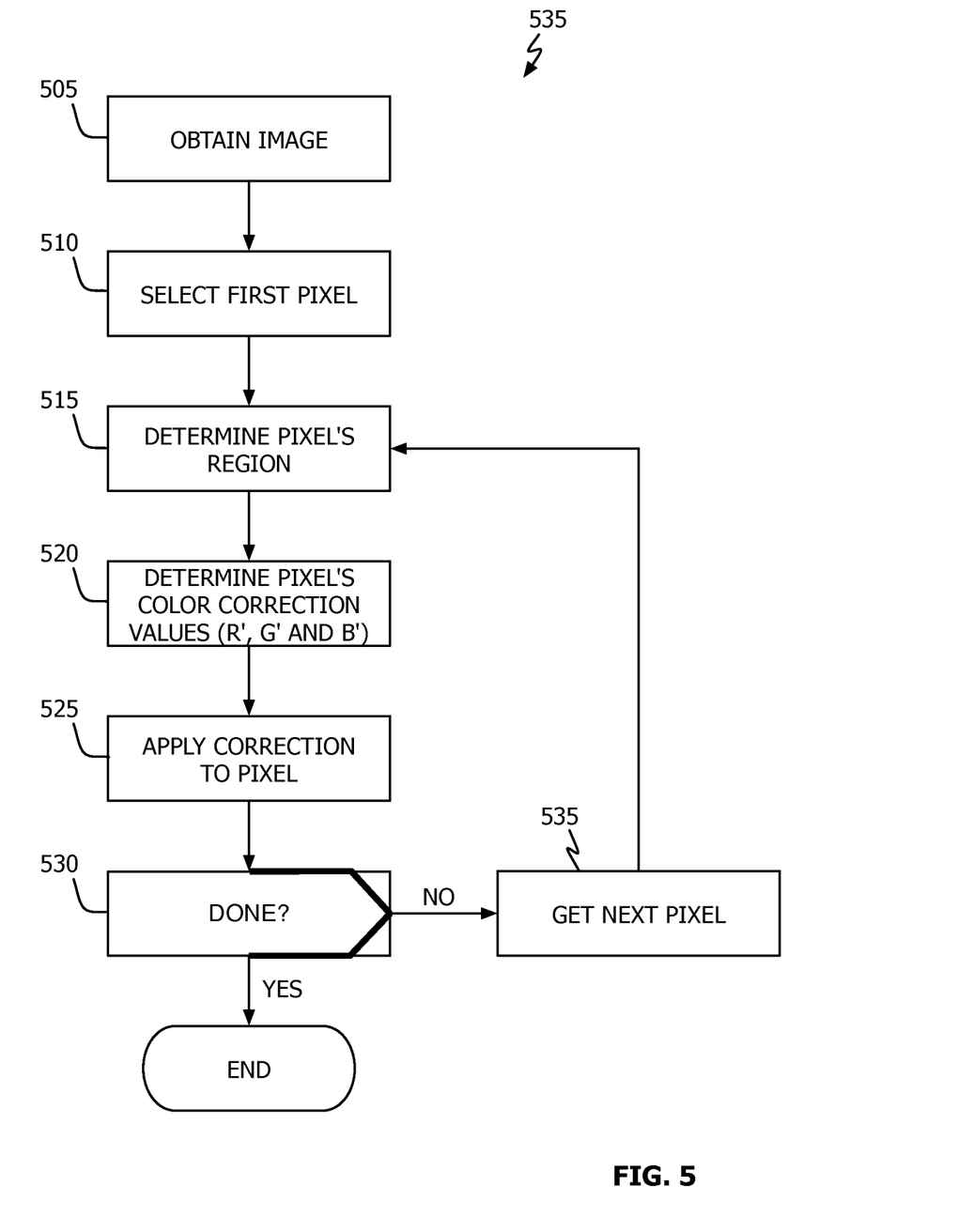
FIG. 5 shows, in flowchart form, a memory color correction operation in accordance with one embodiment.

Referring to FIG. 5, memory color correction process 500 may utilize the results obtained above. First an image may be obtained from, for example, a sensor or long-term storage after Bayer processing has taken place (block 505). A first pixel may be selected from the image (block 510) and its R, G and B values used to determine which Region in color wheel 300, for example, it comes from (block 515). Identifying those equations appropriate for the selected pixel's Region, the pixel's R, G and B values may be used directly to determine its color corrected values in the image's native color space (block 520). (See, for example, EQS. 11 through 13 and Appendices A through E.) Once determined, the color correction may be applied to the selected pixel (block 525). If all relevant pixels in the image have been evaluated (the "YES" prong of block 530), the color corrected image may be passed along an image processing pipeline for additional processing, it may be displayed and/or stored for later viewing. If at least one pixel in the image remains to be evaluated (the "NO" prong of block 530), a "next" pixel is selected (block 535), where after operation 500 resumes at block 515.

Figure 6:
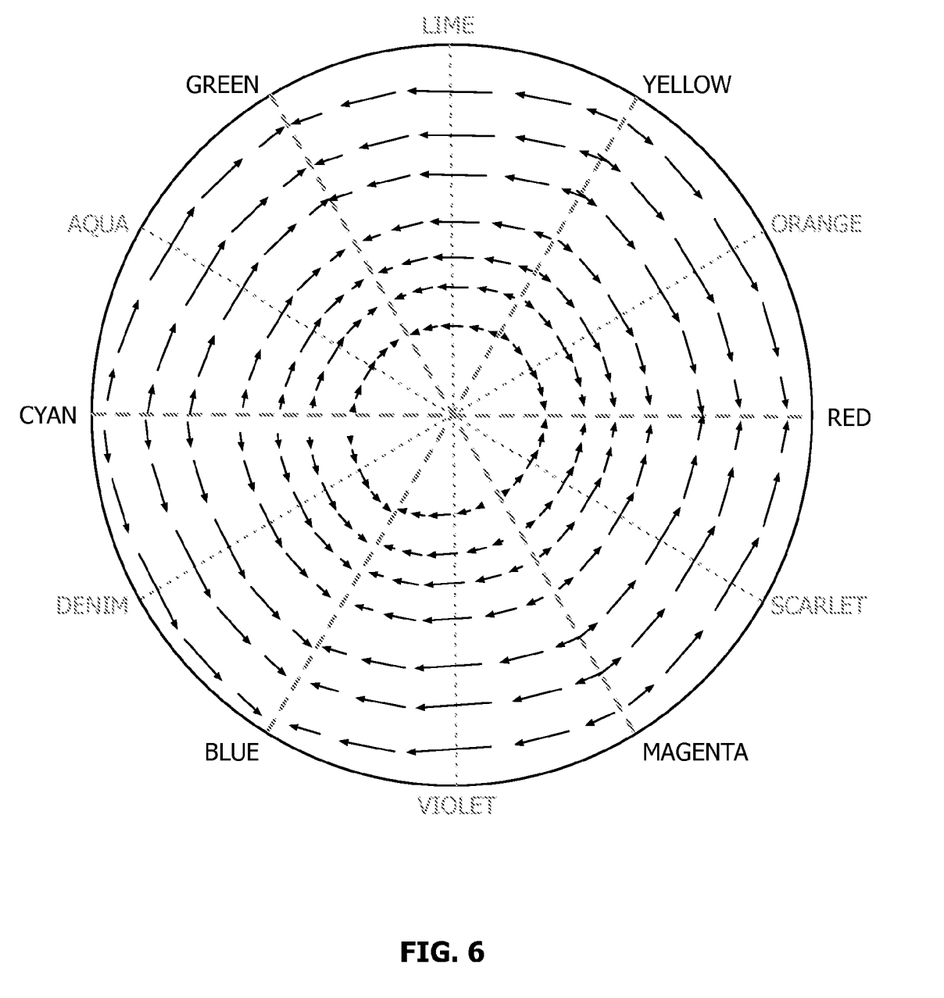
FIG. 6 illustrates the operational characteristics of a color correction scheme in accordance with one embodiment.

The effect of a color correction scheme in accordance with one embodiment may be visualized as illustrated in FIG. 6, where the length of the vectors illustrate the relative strength of the determined color correction value. As shown, principal colors (red, green and blue) attract those tertiary colors in their vicinity (orange/scarlet to red, lime/aqua to green and violet/denim to blue), while secondary colors (yellow cyan and magenta) are not effected. No change is applied to the secondary colors yellow, cyan and magenta. In a sense, primary colors act as magnets that draw local tertiary colors to themselves which compensates for memory color rendering artifacts (which cause primary colors to "bleed" toward tertiary colors). Since secondary colors to not effect memory color rendering artifacts, they are not changed.

Figure 7:
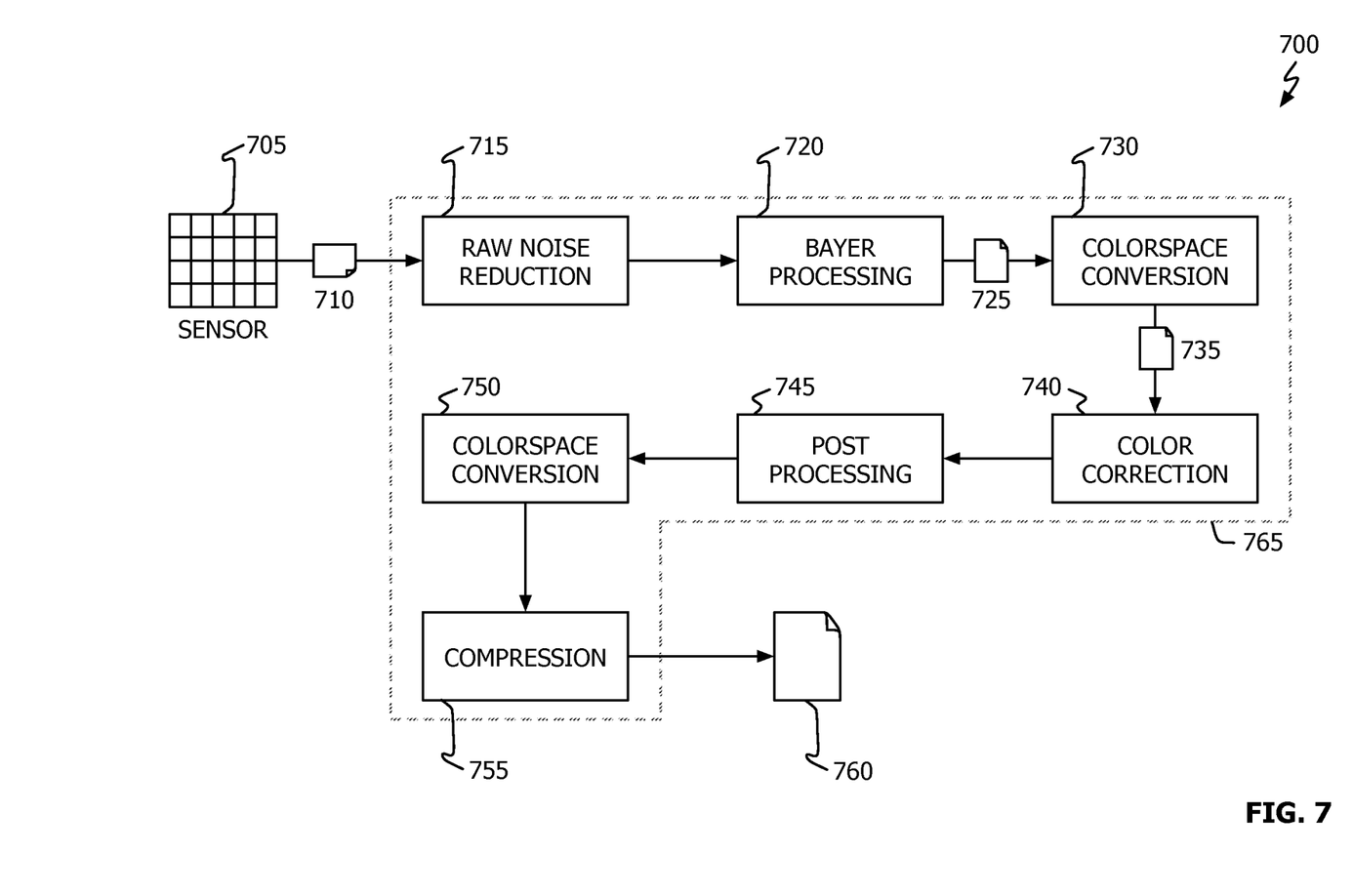
FIG. 7 shows, in block diagram form, an illustrative image processing pipeline within which color correction techniques as disclosed herein may be implemented.

The correction of memory color rendering artifacts in accordance with this disclosure may be implemented within an image processing pipeline. Referring to FIG. 7, in one embodiment image processing pipeline 700 includes sensor 705 that generates image 710. The pixels making up image 710 generally have a value for only one of red, green or blue. Once captured, image 710 is submitted to noise reduction processing 715 to compensate for noise inherent in sensor 705. (Such noise reduction operation 715 is generally developed on a per-sensor basis.) Bayer processing or demosaic operations 720 are performed to produce image 725. Each pixel in image 725 now has a value for red, green and blue values. Image 725 is in native sensor RGB color space. At this point, operation 730 may convert image 725 from the sensor's native RGB color space to a preferred RGB color space appropriate for display on a typical computer monitor, producing image 735. Illustrative RGB color spaces applicable to image 735 include, but are not limited to, Apple RGB, AdobeRGB, CIE RGB and ProPhoto RGB color spaces. Conversion operation 730 may be performed by applying a 3×3 matrix to each pixel. While quick to perform, such operations can introduce a significant amount of tertiary color noise (memory color rendering artifacts). To compensate for this, and other color artifacts in image 735, color correction operations 740 may be applied. It is here that prior art approaches to tertiary color artifact correction would convert image 735 into yet another color space (e.g., an HSV color space), within which the amount of correction would be determined and applied. In accordance with this disclosure, however, tertiary color artifacts may be corrected without the need to convert image 735 into a working color space. It will be recognized that color space conversion operations of the fidelity needed to address tertiary color artifacts is a computationally expensive operation. Color correction as disclosed herein, however, use only a pixel's R, G and B values and coefficients determined a priori for each region (see EQ. 13 and Appendices A through E). Such coefficients may be stored in a readily accessible memory for ease of access.

Once color correction in accordance with operation 740 is complete, post-processing 745 may be applied to, for example, provide gamma correction and apply tone mapping. If the device's output color space is different from the pipeline's operating color space (e.g., YCbCr or YUV), operation 750 may be applied. The resulting image may be compressed (e.g., JPEG or MPEG4 compression) to produce output image 760. Image 760 may be transferred to a memory for display and/or long-term storage. It will be recognized that if output image 760 retains the color space used by image 735, color conversion operation 750 may be avoided. In one embodiment, image processing pipeline 700 may be implemented as part of an image sensor processing package 765 (hardware). In another embodiment, one or more of the described operations may be performed in software and/or firmware.

Figure 8:
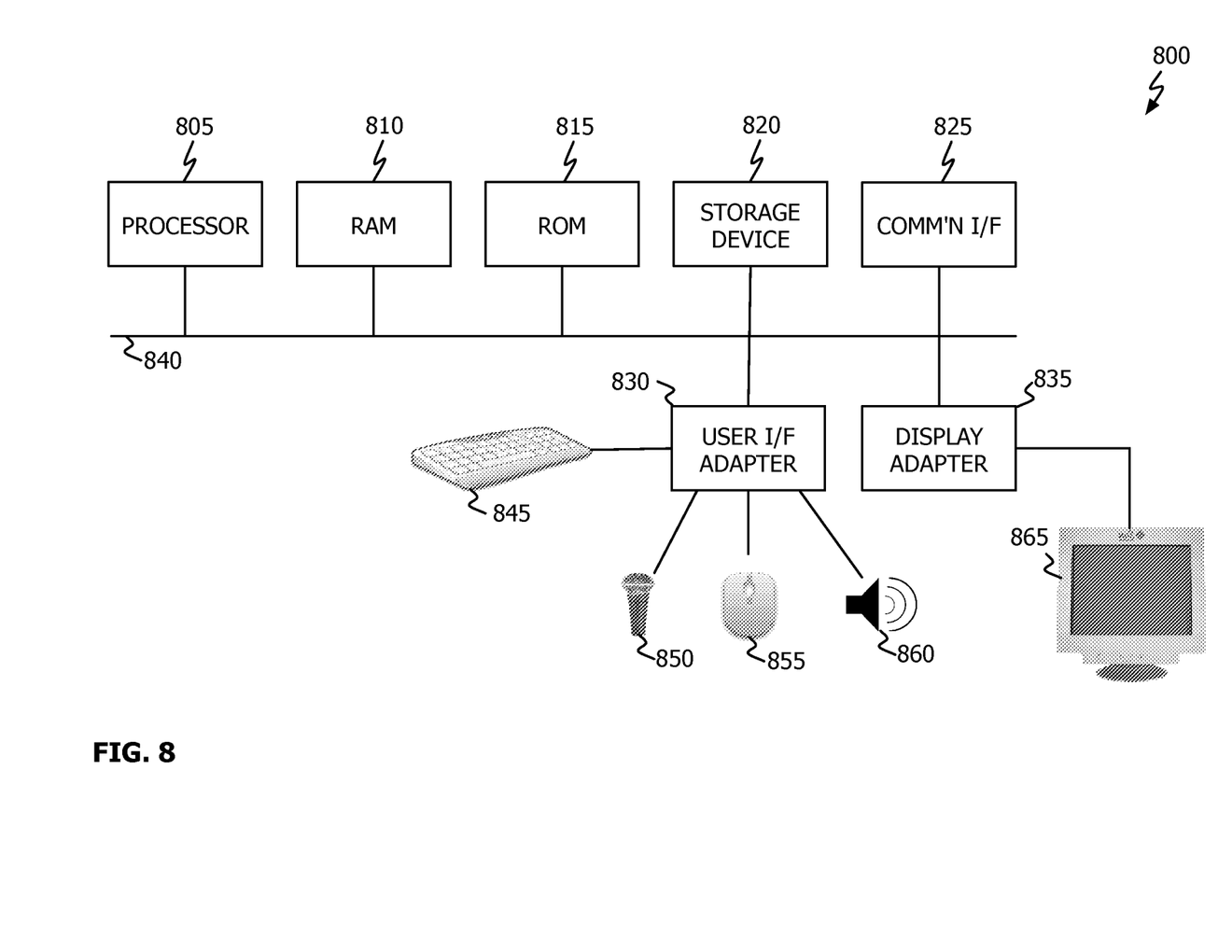
FIG. 8 shows, in block diagram form, a computer system in accordance with one embodiment.

Referring to FIG. 8, representative computer system 800 (e.g., a general purpose desktop computer system or a dedicated image processing workstation) includes processor 805, memory 810, storage 815, graphics hardware 820, communication interface 825, user interface adapter 830 and display adapter 835—all of which may be coupled via system bus or backplane 840. Memory 810 may include one or more different types of media (typically solid-state) used by processor 805 and graphics hardware 820. For example, memory 810 may include memory cache, read-only memory (ROM), and/or random access memory (RAM). Storage 815 may store media (e.g., audio, image and video files), computer program instructions or software, preference information, device profile information, and any other suitable data. Storage 815 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 810 and storage 815 may be used to tangibly retain computer program instructions or code organized into one or more modules and written in any desired computer programming language. When executed by processor 805 and/or graphics processor 820 such computer program code may implement one or more of the methods described herein. Communication interface 825 may be used to connect system 800 to a network. Illustrative networks include, but are not limited to: a local network such as a USB network; a business' local area network; or a wide area network such as the Internet. User interface adapter 830 may be used to connect keyboard 845, microphone 850, pointer device 855, speaker 860 and other user interface devices such as a touch-pad and/or a touch screen (not shown). Display adapter 835 may be used to connect display 865.

Processor 805 may include any programmable control device including, without limitation, one or more members from: the Intel Core®, Intel Atom®, Pentium® and Celeron® processor families. (INTEL CORE, INTEL ATOM, PENTIUM and CELERON are registered trademarks of the Intel Corporation.) Processor 805 may also be implemented as a custom designed circuit that may be embodied in hardware devices such as application specific integrated circuits (ASICs) and field programmable gate arrays (FPGAs). Computer system 800 may also include (or have coupled to it via communication interface 825 or system bus 840) an image processing pipeline in accordance with FIG. 7. Finally, system 805 may have resident thereon any desired operating system.

Various changes in the materials, components, circuit elements, as well as in the details of the described operational methods are possible without departing from the scope of the following claims. For instance, any RGB color space may be used within the framework of image processing pipeline 700 or by computer system 800. In addition, color correction functions other than a quadratic equation may be used. By way of example only, functions such as sine, cosine and higher order polynomials may also be used. Given the above description, one of ordinary skill in the art would recognize that color correction function EQ. 7 may be shaped in any what that's suited for the type of color correction required. For example, a third-order polynomial may be used to shape the color correction response such that certain regions would experience greater (lesser) amounts of correction than other regions. (EQ. 7 implements asymmetric color correction scheme.) It will also be recognized that the amount of color correction applied in any given embodiment (e.g., parameter 'A' of EQ. 13) is subjective in nature and may change from implementation to implementation. In one embodiment, 'A' may be determined empirically by viewing images before correction, color correcting the images to be "pleasing" and then back determining what value of 'A' is necessary to achieve the desired result. Yet further, the applied bias or offset (e.g., 'k') may assume any function appropriate for the target implementation (linear or non-linear). It should also be noted that the disclosed color correction techniques are applicable to a wide-range of devices such as, for example, still and video cameras, digital scanners, and motion picture cameras.

Finally, it is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

APPENDIX A

Color Correction Equations for Region 1 of FIG. 3

In Region 1, R>G>B). A pixel's HSV values may be expressed in terms of R, G and B values as follows:

$$H = \frac{(G-B)}{(R-B)}\left(\frac{1}{6}\right),\quad \text{EQ. A1}$$

$$S = \frac{(R-B)}{R}, \text{ and} \quad \text{EQ. A2}$$

$$V = R \quad \text{EQ. A3}$$

where the (1/6) factor normalizes H to the range of [0,1].

If H is constrained to remain in Region 1 and a linear bias or offset is applied, then:

$$(R>G-k>B). \quad \text{EQ. A4}$$

Applying EQS. A1 and A4, the change in H ($\Delta H$) may be given as:

$$\Delta H = H' - H = \frac{k}{6(B-R)}. \quad \text{EQ. A5}$$

Using a quadratic function to express the manner in which $\Delta H$ changes as above, $\Delta H$ for Region 1 may be given as:

$$\Delta H = \begin{cases} A(-144H^2 + 24H) & 0 < H < \frac{1}{6} \\ 0 & \text{otherwise} \end{cases} \quad \text{EQ. A6}$$

Bias or offset term k may be expressed in terms of R, G and B values:

$$k = \frac{24A(G-R)(B-G)}{(B-R)}. \quad \text{EQ. A7}$$

Color corrected values R', G' and B' may be given:

$$R' = R, \quad \text{EQ. A8}$$

$$G' = G - \frac{24A(G-R)(B-G)}{(B-R)}, \text{ and} \quad \text{EQ. A9}$$

$$B' = B. \quad \text{EQ. A10}$$

APPENDIX B

Color Correction Equations for Region 2 of FIG. 3

In Region 2, G>R>B). A pixel's HSV values may be expressed in terms of R, G and B values as follows:

$$H = \frac{(B-R)}{(G-B)}\left(\frac{1}{6}\right) + \frac{1}{3}, \quad \text{EQ. B1}$$

$$S = \frac{(R-B)}{R}, \text{ and} \quad \text{EQ. B2}$$

$$V = R \quad \text{EQ. B3}$$

where the (1/6) and (1/3) factors normalize H to the range of [0,1].

If H is constrained to remain in Region 2 and a linear bias or offset is applied, then:

$$(G>R-k>B). \quad \text{EQ. B4}$$

Applying EQS. B1 and B4, the change in H ($\Delta H$) may be given as:

$$\Delta H = H' - H = \frac{k}{6(G-B)}. \quad \text{EQ. B5}$$

Using a quadratic function to express the manner in which $\Delta H$ changes as above, $\Delta H$ for Region 2 may be given as:

$$\Delta H = \begin{cases} A(-144H^2 + 72H - 8) & \frac{1}{6} < H < \frac{2}{6} \\ 0 & \text{otherwise} \end{cases} \quad \text{EQ. B6}$$

Bias or offset term k may be expressed in terms of R, G and B values:

$$k = \frac{24A(B-R)(G-R)}{(B-G)}. \quad \text{EQ. B7}$$

Color corrected values R', G' and B' may be given:

$$R' = R - \frac{24A(B-R)(G-R)}{(B-G)}, \quad \text{EQ. B8}$$

$$G' = G, \text{ and} \quad \text{EQ. B9}$$

$$B' = B. \quad \text{EQ. B10}$$

APPENDIX C

Color Correction Equations for Region 3 of FIG. 3

In Region 3, G>B>R). A pixel's HSV values may be expressed in terms of R, G and B values as follows:

$$H = \frac{(B-R)}{(G-R)}\left(\frac{1}{6}\right) + \frac{1}{3}, \quad \text{EQ. C1}$$

$$S = \frac{(G-R)}{G}, \text{ and} \quad \text{EQ. C2}$$

$$V = R \quad \text{EQ. C3}$$

where the (1/6) and (1/3) factors normalize H to the range of [0,1].

If H is constrained to remain in Region 3 and a linear bias or offset is applied, then:

$$(G>B-k>R). \quad \text{EQ. C4}$$

Applying EQS. C1 and C4, the change in H ($\Delta H$) may be given as:

$$\Delta H = H' - H = \frac{k}{6(R-G)}. \quad \text{EQ. C5}$$

Using a quadratic function to express the manner in which ΔH changes as above, ΔH for Region 3 may be given as:

$$\Delta H = \begin{cases} A(-144H^2 + 120H - 24) & \frac{2}{6} < H < \frac{3}{6} \\ 0 & \text{otherwise} \end{cases} \quad \text{EQ. C6}$$

Bias or offset term k may be expressed in terms of R, G and B values:

$$k = \frac{24A(B-R)(B-G)}{(G-R)}. \quad \text{EQ. C7}$$

Color corrected values R', G' and B' may be given:

$$R' = R, \quad \text{EQ. C8}$$

$$G' = G, \text{ and} \quad \text{EQ. C9}$$

$$B' = B - \frac{24A(B-R)(B-G)}{(G-R)}. \quad \text{EQ. C10}$$

APPENDIX D

Color Correction Equations for Region 4 of FIG. 3

In Region 4, B>G>R). A pixel's HSV values may be expressed in terms of R, G and B values as follows:

$$H = \frac{(R-G)}{(B-R)}\left(\frac{1}{6}\right) + \frac{2}{3}, \quad \text{EQ. D1}$$

$$S = \frac{(B-R)}{B}, \text{ and} \quad \text{EQ. D2}$$

$$V = B \quad \text{EQ. D3}$$

where the (1/6) and (2/3) factors normalize H to the range of [0,1].

If H is constrained to remain in Region 4 and a linear bias or offset is applied, then:

$$(B > G - k > R). \quad \text{EQ. D4}$$

Applying EQS. D1 and D4, the change in H (ΔH) may be given as:

$$\Delta H = H' - H = \frac{k}{6(B-R)}. \quad \text{EQ. D5}$$

Using a quadratic function to express the manner in which ΔH changes as above, ΔH for Region 4 may be given as:

$$\Delta H = \begin{cases} A(-144H^2 + 168H - 48) & \frac{3}{6} < H < \frac{4}{6} \\ 0 & \text{otherwise} \end{cases} \quad \text{EQ. D6}$$

Bias or offset term k may be expressed in terms of R, G and B values:

$$k = \frac{24A(B-G)(G-R)}{(B-R)}. \quad \text{EQ. D7}$$

Color corrected values R', G' and B' may be given:

$$R' = R, \quad \text{EQ. D8}$$

$$G' = G - \frac{24A(B-G)(G-R)}{(B-R)}, \text{ and} \quad \text{EQ. D9}$$

$$B' = B. \quad \text{EQ. D10}$$

APPENDIX E

Color Correction Equations for Region 5 of FIG. 3

In Region 5, B>R>G). A pixel's HSV values may be expressed in terms of R, G and B values as follows:

$$H = \frac{(R-G)}{(B-G)}\left(\frac{1}{6}\right) + \frac{2}{3}, \quad \text{EQ. E1}$$

$$S = \frac{(B-G)}{B}, \text{ and} \quad \text{EQ. E2}$$

$$V = B \quad \text{EQ. E3}$$

where the (1/6) and (2/3) factors normalize H to the range of [0,1].

If H is constrained to remain in Region 5 and a linear bias or offset is applied, then:

$$(B > R - k > G). \quad \text{EQ. E4}$$

Applying EQS. E1 and E4, the change in H (ΔH) may be given as:

$$\Delta H = H' - H = \frac{k}{6(G-B)}. \quad \text{EQ. C5}$$

Using a quadratic function to express the manner in which ΔH changes as above, ΔH for Region 5 may be given as:

$$\Delta H = \begin{cases} A(-144H^2 + 216H - 80) & \frac{4}{6} < H < \frac{5}{6} \\ 0 & \text{otherwise} \end{cases} \quad \text{EQ. E6}$$

Bias or offset term k may be expressed in terms of R, G and B values:

$$k = \frac{24A(G-R)(B-R)}{(B-G)}. \quad \text{EQ. E7}$$

Color corrected values R', G' and B' may be given:

$$R' = R - \frac{24A(G-R)(B-R)}{(B-G)},\quad \text{EQ. E8}$$

$$G' = G, \text{ and} \quad \text{EQ. E9}$$

$$B' = B. \quad \text{EQ. E10}$$

The invention claimed is:

1. A non-transitory program storage device, readable by a processor and comprising instructions stored thereon to cause the processor to:
   select a first pixel from a digital image, the first pixel having component values from a first color space, the first color space comprising a red-green-blue color space;
   determine to which of a plurality of disjoint regions in a specified color gamut the first pixel belongs based on the first pixel's component values, wherein determining which of a plurality of disjoint regions comprises selecting a single region from the plurality of disjoint regions consisting of:
      a first region when the first pixel's red component value is greater than the first pixel's green component value which is greater than the first pixel's blue component value;
      a second region when the first pixel's green component value is greater than the first pixel's red component value which is greater than the first pixel's blue component value;
      a third region when the first pixel's green component value is greater than the first pixel's blue component value which is greater than the first pixel's red component value;
      a fourth region when the first pixel's blue component value is greater than the first pixel's green component value which is greater than the first pixel's red component value;
      a fifth region when the first pixel's blue component value is greater than the first pixel's red component value which is greater than the first pixel's green component value; and
      a sixth region when the first pixel's red component value is greater than the first pixel's blue component value which is greater than the first pixel's green component value;
   calculate a color correction value for each of the first pixel's component values based, at least in part, on the determined region and the first pixel's component values, wherein each determined color correction value is expressed in the first color space;
   apply each calculated color correction value to the first pixel's corresponding component value to produce a first color corrected pixel; and
   repeat execution of the instructions to select, determine, calculate and apply for each of a plurality of pixels from the digital image to produce a color corrected image in the first color space.

2. The non-transitory program storage device of claim 1, wherein the instructions to cause the processor to determine a color correction value comprise instructions to cause the processor to determine the blue component color correction value is expressed by:

$$B - \frac{24A(B-G)(R-B)}{(R-G)},$$

where
R represents the first pixel's red component value, G represents the first pixel's green component value, B represents the first pixel's blue component value, and A represents an implementation-dependent gain factor.

3. The non-transitory program storage device of claim 1, wherein the instructions to cause the processor to apply each calculated color correction value comprise instructions to cause the processor to store the first color corrected pixel in a memory at a location corresponding to the first pixel in the digital image.

4. The non-transitory program storage device of claim 3, wherein the instructions to cause the processor to store the first color corrected pixel comprise instructions to cause the processor to store the first color corrected pixel in a location identical to the first pixel.

5. The non-transitory program storage device of claim 1, wherein the instructions to cause the processor to repeat comprise instructions to cause the processor to repeat the instructions to select, determine, calculate and apply for each pixel in the digital image.

6. A digital image processing system, comprising:
   a first memory to store a digital image having a plurality of pixels, each pixel expressed as a plurality of component color values in a sensor color space corresponding to a sensor that captured the digital image;
   a second memory; and
   a programmable control device communicatively coupled to the first and second memories, the second memory further including instructions to cause the programmable control device to—
   select a pixel from the sensor color space,
   determine to which of a plurality of disjoint regions in a specified color gamut the pixel belongs based on the pixel's component values,
   derive a color correction value for each of the pixel's component values before conversion of the digital image to a second color space, the derivation based, at least in part, on the determined region and the pixel's component values, wherein each determined color correction value is expressed in the sensor color space,
   apply each determined color correction value to the pixel's corresponding component value to produce a color corrected pixel, and
   repeat execution of the instructions to select, determine, derive and apply for each of the plurality of pixels from the digital image to produce a color corrected digital image.

7. The digital image processing system of claim 6, wherein the act of applying each determined color correction value is performed before the digital image is converted to the second color space.

8. The digital image processing system of claim 6, wherein the sensor color space comprises a Red-Green-Blue color space.

9. The digital image processing system of claim 6, wherein the instructions stored in the second memory further comprise instructions to cause the programmable control device convert each of the pixels in the color corrected digital image to a different color space to produce a second color corrected image.

10. The digital image processing system of claim 9, wherein the instructions stored in the second memory further comprise instructions to cause the programmable control device to:
  encode the second color corrected image into a Joint Photographic Experts Group format; and
  store the encoded second color corrected image in a non-transitory memory.

11. A digital image color correction method, comprising:
  selecting a first pixel from a digital image, the first pixel having component values from a first color space, the first color space comprising a red-green-blue color space;
  determining to which of a plurality of disjoint regions in a specified color gamut the first pixel belongs based on the first pixel's component values;
  calculating a color correction value for each of the first pixel's component values based, at least in part, on the determined region and the first pixel's component values, wherein each determined color correction value is expressed in the first color space and wherein the blue component color correction value is expressed by:

$$B - \frac{24A(B-G)(R-B)}{(R-G)},$$

where
R represents the first pixel's red component value, G represents the first pixel's green component value, B represents the first pixel's blue component value, and A represents an implementation-dependent gain factor;
  applying each determined color correction value to the first pixel's corresponding component value to produce a first color corrected pixel; and
  repeating the acts of selecting, determining, calculating and applying for each of a plurality of pixels from the digital image to produce a color corrected image in the first color space.

12. The method of claim 11, wherein the act of determining to which of a plurality of disjoint regions in a specified color gamut the first pixel belongs comprises selecting a single region from the plurality of disjoint regions consisting of:
  a first region when the first pixel's red component value is greater than the first pixel's green component value which is greater than the first pixel's blue component value;
  a second region when the first pixel's green component value is greater than the first pixel's red component value which is greater than the first pixel's blue component value;
  a third region when the first pixel's green component value is greater than the first pixel's blue component value which is greater than the first pixel's red component value;
  a fourth region when the first pixel's blue component value is greater than the first pixel's green component value which is greater than the first pixel's red component value;
  a fifth region when the first pixel's blue component value is greater than the first pixel's red component value which is greater than the first pixel's green component value; and
  a sixth region when the first pixel's red component value is greater than the first pixel's blue component value which is greater than the first pixel's green component value.

13. The method of claim 11, wherein the act of applying each determined color correction value comprises storing the first color corrected pixel in a memory at a location corresponding to the first pixel in the digital image.

14. The method of claim 13, wherein the act of storing the first color corrected pixel comprises storing the first color corrected pixel in a location identical to the first pixel.

15. The method of claim 11, wherein the act of repeating comprises repeating the acts of selecting, determining, calculating and applying for each pixel in the digital image.

16. A non-transitory program storage device, readable by a programmable control device and comprising instructions stored thereon to cause the programmable control device to:
  obtain a color digital image having pixels, each pixel having multiple component values from a sensor color space corresponding to a sensor that captured the digital image;
  identify a first pixel from the pixels;
  determine to which of a plurality of regions from a specified color gamut the first pixel belongs based on the first pixel's component values;
  derive a color correction value for each of the first pixel's component values before conversion of the color digital image to a second color space, the derivation based, at least in part, on the first pixel's component values and the determined region, wherein each determined color correction value is expressed in the sensor color space;
  apply the first pixel's determined color correction values to each of the first pixel's corresponding component values to generate a first color corrected pixel;
  repeat the instructions to obtain, identify, determine, derive and apply for a plurality of pixels in the color digital image to produce a color corrected digital image; and
  store the color corrected digital image in a memory.

17. The non-transitory program storage device of claim 16, wherein the instructions to cause the programmable control device to obtain a color digital image comprise instructions to cause the programmable control device to obtain a color digital image from the sensor that captured the digital image.

18. The non-transitory program storage device of claim 16, wherein the sensor color space comprises a red-green-blue color space.

19. The non-transitory program storage device of claim 16, wherein the instructions to cause the programmable control device to determine to which of a plurality of regions from a specified color gamut the first pixel belongs comprise instructions to determine to which of a plurality of mutually disjoint regions from the specified color gamut the first pixel belongs.

20. The non-transitory program storage device of claim 16, further comprising instructions to cause the programmable control device to convert each of the pixels in the color corrected digital image to the second color space to produce a second color corrected digital image, wherein the second color space is different from the sensor color space.

21. The non-transitory program storage device of claim 20, further comprising instructions to cause the programmable control device to:
  encode the second color corrected digital image into a Joint Photographic Experts Group format; and
  store the encoded second color corrected digital image to a second non-transitory memory.

22. The non-transitory program storage device of claim 20, wherein the sensor color space comprises a first linear Red-Green-Blue color space and the second color space comprises a different linear red-green-blue color space.

23. The non-transitory program storage device of claim 16, wherein the programmable control device comprises a general purpose computer processor.

24. The non-transitory program storage device of claim 16, wherein:
the sensor color space comprises a first red-green-blue color space wherein each of the pixels comprise a red component value, a green component value and a blue component value; and
the instructions to determine to which of a plurality of regions from a specified color gamut the first pixel belongs comprise instructions to cause the programmable control device to select a single region from the plurality of disjoint regions consisting of—
a first region when the first pixel's red component value is greater than the first pixel's green component value which is greater than the first pixel's blue component value,
a second region when the first pixel's green component value is greater than the first pixel's red component value which is greater than the first pixel's blue component value,
a third region when the first pixel's green component value is greater than the first pixel's blue component value which is greater than the first pixel's red component value,
a fourth region when the first pixel's blue component value is greater than the first pixel's green component value which is greater than the first pixel's red component value,
a fifth region when the first pixel's blue component value is greater than the first pixel's red component value which is greater than the first pixel's green component value, and
a sixth region when the first pixel's red component value is greater than the first pixel's blue component value which is greater than the first pixel's green component value.

25. A digital image processing system, comprising:
a first memory to store a digital image having pixels, each of the pixels having a plurality of component values from a first color space; and
a programmable control device coupled to the memory, the memory further having stored therein instructions to cause the programmable control device to—
obtain a first pixel of the digital image from the first memory,
determine to which of a plurality of disjoint regions from a specified color gamut the first pixel belongs based on the first pixel's component values, wherein determining to which of a plurality of disjoint regions comprises selecting a single region from the plurality of disjoint regions consisting of:
a first region when the first pixel's red component value is greater than the first pixel's green component value which is greater than the first pixel's blue component value;
a second region when the first pixel's green component value is greater than the first pixel's red component value which is greater than the first pixel's blue component value;
a third region when the first pixel's green component value is greater than the first pixel's blue component value which is greater than the first pixel's red component value;
a fourth region when the first pixel's blue component value is greater than the first pixel's green component value which is greater than the first pixel's red component value;
a fifth region when the first pixel's blue component value is greater than the first pixel's red component value which is greater than the first pixel's green component value; and
a sixth region when the first pixel's red component value is greater than the first pixel's blue component value which is greater than the first pixel's green component value,
derive a color correction value for each of the first pixel's component values based, at least in part, on the first pixel's component values and the determined region, the color correction values expressed in the first color space,
apply each of the determined color correction values to the corresponding color component value of the first pixel to produce a first color corrected pixel, wherein the instructions to cause the programmable control device to apply further comprise instructions to cause the programmable control device to store the first color corrected pixel in a second memory, and
repeatedly perform the instructions to obtain, determine, derive and apply to produce a color corrected digital image.

26. The digital image processing system of claim 25, wherein the first memory and the second memory are the same memory.

27. The digital image processing system of claim 25, wherein the programmable control device comprises a special purpose image processing device.

28. The digital image processing system of claim 25, wherein the first memory further has stored therein instructions to cause the programmable control device to convert the color corrected digital image to a different color space.

29. A color correction method, comprising:
obtaining a color digital image having pixels, each pixel having multiple component values from a sensor color space corresponding to a sensor that captured the digital image;
identifying a first subset of pixels from the pixels;
determining a first plurality of color correction values before conversion of the color digital image to a second color space, the determining based, at least in part, on each of the first plurality of color correction values corresponding to a pixel in the first subset of pixels, each of the first plurality of color correction values comprising multiple component values from the sensor color space;
applying each of the first plurality of color correction values to their corresponding pixel in the first subset of pixels to produce a first plurality of color corrected pixels, each of the first plurality of color corrected pixels corresponding to a pixel in the first subset of pixels, each of the first plurality of color corrected pixels comprising multiple component values from the sensor color space; and
repeating the acts of identifying, determining and applying a plurality of times to produce a color corrected image, each time identifying a distinct subset of pixels from the pixels, each pixel in the color corrected image having multiple component values from the sensor color space.

30. The method of claim 29, wherein the act applying each of the first plurality of color correction values comprises applying each of the first plurality of color correction values before the color digital image is converted to the second color space.

31. The method of claim 29, wherein the sensor color space comprises a Red-Green-Blue color space.

32. The method of claim 29, further comprising converting each of the pixels in the color corrected image to a different color space to produce a second color corrected image.

33. The method of claim 32, further comprising:
encoding the second color corrected image into a Joint Photographic Experts Group format; and
storing the encoded second color corrected image in a non-transitory memory.

* * * * *